United States Patent
Poddar et al.

(10) Patent No.: US 10,521,688 B2
(45) Date of Patent: Dec. 31, 2019

(54) EFFICIENT SIMD IMPLEMENTATION OF 3X3 NON MAXIMA SUPPRESSION OF SPARSE 2D IMAGE FEATURE POINTS

(71) Applicant: TEXAS INSTRUMENTS INCORPORATED, Dallas, TX (US)

(72) Inventors: Deepak Kumar Poddar, Karnataka (IN); Pramod Kumar Swami, Karnataka (IN); Prashanth Viswanath, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/989,551

(22) Filed: May 25, 2018

(65) Prior Publication Data
US 2019/0005349 A1 Jan. 3, 2019

Related U.S. Application Data

(63) Continuation of application No. 15/203,973, filed on Jul. 7, 2016, now Pat. No. 9,984,305.

(30) Foreign Application Priority Data

Apr. 19, 2016 (IN) .............................. 201641013532

(51) Int. Cl.
- G06K 9/00 (2006.01)
- G06K 9/46 (2006.01)
- G06K 9/62 (2006.01)

(52) U.S. Cl.
CPC ....... G06K 9/4609 (2013.01); G06K 9/00986 (2013.01); G06K 9/4671 (2013.01); G06K 9/6202 (2013.01)

(58) Field of Classification Search
CPC .......................... G06K 9/4609; G06K 9/6202
See application file for complete search history.

(56) References Cited

U.S. PATENT DOCUMENTS

| 5,563,962 A | 10/1996 | Peters et al. |
| 5,592,571 A | 1/1997 | Peters |

(Continued)

OTHER PUBLICATIONS

Ming Qi, et al., "Parallel and SIMD Optimization of Image Feature Extraction", International Conference on Computational Science, ICCS 2011, Procedia Computer Science 4 (2011) pp. 489-498.

*Primary Examiner* — Aaron W Carter
(74) *Attorney, Agent, or Firm* — Kenneth Liu; Charles A. Brill; Frank D. Cimino

(57) ABSTRACT

This invention transforms a list of feature points in raster scan order into a list of maxima suppressed feature points. A working buffer has two more entries than the width of the original image. Each entry is assigned to an x coordinate of the original image. Each entry stores a combined y coordinate and reliability score for each feature point in the original list. This process involves a forward scan and a backward scan. For each original feature point its x coordinate defines the location within the working buffer where neighbor feature points would be stored if they exist. The working buffer initial data and the y coordinates assure a non-suppress comparison result if the potential neighbors are not actual neighbors. For actual neighbor data, the y coordinates match and the comparison result depends solely upon the relative reliability scores.

16 Claims, 11 Drawing Sheets

(56) References Cited

U.S. PATENT DOCUMENTS

| | | | |
|---|---|---|---|
| 5,809,322 A | 9/1998 | Akerib | |
| 6,563,596 B1* | 5/2003 | Narushima | H04N 1/00002 |
| | | | 358/1.14 |
| 8,855,968 B1 | 10/2014 | Gillis | |
| 8,988,536 B2 | 3/2015 | Park et al. | |
| 9,020,209 B2 | 4/2015 | Minato | |
| 9,024,272 B2 | 5/2015 | Sakai | |
| 9,165,369 B1* | 10/2015 | Zhang | G06K 9/628 |
| 9,270,712 B2 | 2/2016 | Katragadda et al. | |
| 9,524,430 B1* | 12/2016 | Cho | G06K 9/00456 |
| 9,626,579 B2* | 4/2017 | Gan | G06T 1/20 |
| 9,652,686 B2* | 5/2017 | Sankaranarayanan | |
| | | | G06K 9/4638 |
| 9,747,527 B2 | 8/2017 | Baranowski et al. | |
| 9,984,305 B2* | 5/2018 | Poddar | G06K 9/00986 |
| 2009/0154792 A1* | 6/2009 | Sun | G06T 5/20 |
| | | | 382/154 |
| 2009/0238466 A1* | 9/2009 | Golan | G06K 9/4609 |
| | | | 382/199 |
| 2014/0085501 A1 | 3/2014 | Tran | |
| 2014/0247963 A1* | 9/2014 | Lin | G06K 9/6202 |
| | | | 382/103 |
| 2015/0317532 A1* | 11/2015 | Gan | G06T 1/20 |
| | | | 382/199 |
| 2016/0125257 A1* | 5/2016 | Sankaranarayanan | |
| | | | G06K 9/4638 |
| | | | 382/199 |
| 2016/0171344 A1 | 6/2016 | Chen et al. | |
| 2017/0011520 A1* | 1/2017 | Mathew | G06K 9/6218 |
| 2017/0091952 A1* | 3/2017 | Sun | G06T 5/10 |
| 2017/0161588 A1* | 6/2017 | Chen | G06K 9/6267 |
| 2017/0300773 A1 | 10/2017 | Poddar et al. | |
| 2019/0005349 A1* | 1/2019 | Poddar | G06K 9/00986 |

\* cited by examiner

EFFICIENT SIMD IMPLEMENTATION OF 3X3 NON MAXIMA SUPPRESSION OF SPARSE 2D IMAGE FEATURE POINTS

CROSS-REFERENCE TO RELATED APPLICATION

This application is a continuation of U.S. patent application Ser. No. 15/203,973 filed on Jul. 7, 2016 (now U.S. Pat. No. 9,984,305), which claims priority to India Provisional Patent Application No. 201641013532 filed on Apr. 19, 2016, which are incorporated herein by reference in their entireties.

TECHNICAL FIELD OF THE INVENTION

The technical field of this invention is computer implemented image processing.

BACKGROUND OF THE INVENTION

Standard methods to do non maxima suppression of sparse feature points can not be vectorized easily. This invention proposes a method which can be used for non maxima suppression to exploit SIMD capability of the VLIW architecture based processors.

SUMMARY OF THE INVENTION

This invention is a computer implemented image processing including a method of transforming a list of feature points of an image into a list of maxima suppressed feature points of the image. The original feature point list is sorted in raster scan order. Each such feature point has an x coordinate, a y coordinate and a reliability score indicating strength. A feature points is suppressed if it has a stronger feature point neighbor to the left, above left, above, above right, right, below right, below or below left. The resultant feature point list omits original feature point not maxima in their neighborhood.

This invention employs a working buffer. The working buffer preferably includes two more entries than the width extent of the original image. Each entry is assigned to a possible x coordinate of a pixel of the original image. A first and a last entry enable easy consideration of left and right edge cases. Each entry is large enough to store a combined y coordinate and reliability score for each feature point in the original list. This data is advantageously packed in each working buffer entry with the y coordinate data as the most significant bits and the reliability score data as the least significant bits. This working buffer is advantageously employed to find data on potential neighbor feature points.

This process involves two loops including a forward scan and a backward scan. The forward scan considers each original feature point from a first to a last. For each original feature point its x coordinate defines the location within the working buffer where neighbor feature points would be stored if they exist. The location in the working buffer having an x coordinate one less than the x coordinate of the current feature point potentially stores data of a left or top left neighbor. The location in the working buffer having an x coordinate equal to the x coordinate of the current feature point potentially stores data of a top neighbor. The location in the working buffer having an x coordinate one more than the x coordinate of the current feature point potentially stores data of a top right neighbor.

The forward scan makes four comparisons. A first comparison compares the combined y coordinate and reliability score of the current feature point with the potential left neighbor data. The second, third and fourth comparisons compare the combined y coordinate and reliability score of the current feature point with the potential top left, top and top right neighbor data. In each of these three top comparisons the y coordinate of the potential neighbor data is incremented. A comparison for each such neighbor includes three possible cases. In a first case, no prior feature point in the raster scan order mapped to that location. In this case the initialization of the working buffer always causes a not suppress result. In a second case, the working buffer location stores feature point data from an earlier feature point that is not a neighbor to the current feature point. In this case the y coordinate data recalled from the working buffer locations does not match. Due to the raster scan order, this y coordinate data is less than the y coordinate of the current feature point. Because the y coordinates are the most significant bits of for each comparison, this also causes a not suppress result. In the third case, the accessed working buffer location stores data for an actual neighbor to the current feature point. In this case the y coordinates match either initially for the potential left neighbor or as incremented for the potential top left, top and top right neighbors. In such a case the comparison result depends solely upon the relative reliability scores. The comparison is arranged to properly generate a suppress/not suppress result dependent upon the reliability scores.

Following these comparisons the combined y coordinate and reliability score of the current feature point is unconditionally written into the working buffer at a location corresponding to its x coordinate. This process stores data of prior feature points in the original list for later comparison. The forward scan then repeats for the next feature point in the original list.

The backward scan operates similarly for potential right, bottom right, bottom and bottom left neighbors. The working buffer is re-initialized. The backward scan operates upon an inverted y coordinate to make the sense of the comparisons the same as for the forward scan.

Following the forward and backward scans a new feature point list is formed of those feature points not suppressed. This is preferably implemented with a valid buffer initially indicating all original feature points are valid. Each time any comparison generates a suppress result, the corresponding entry in the valid buffer is changed to invalid. Following the forward and backward scans, the resulting valid buffer indicates which original feature points appear in the suppressed feature point list.

This technique for maxima suppression can be vectorized with acceptable compromise on quality assuming feature points are sparse data. This technique includes just two loops without the nested loops of the prior art. Movement of data is much reduced as compared with the prior art. Several techniques avoid conditional branching and the accompanying pipeline hits. There are many parts of this technique suitable for SIMD execution.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
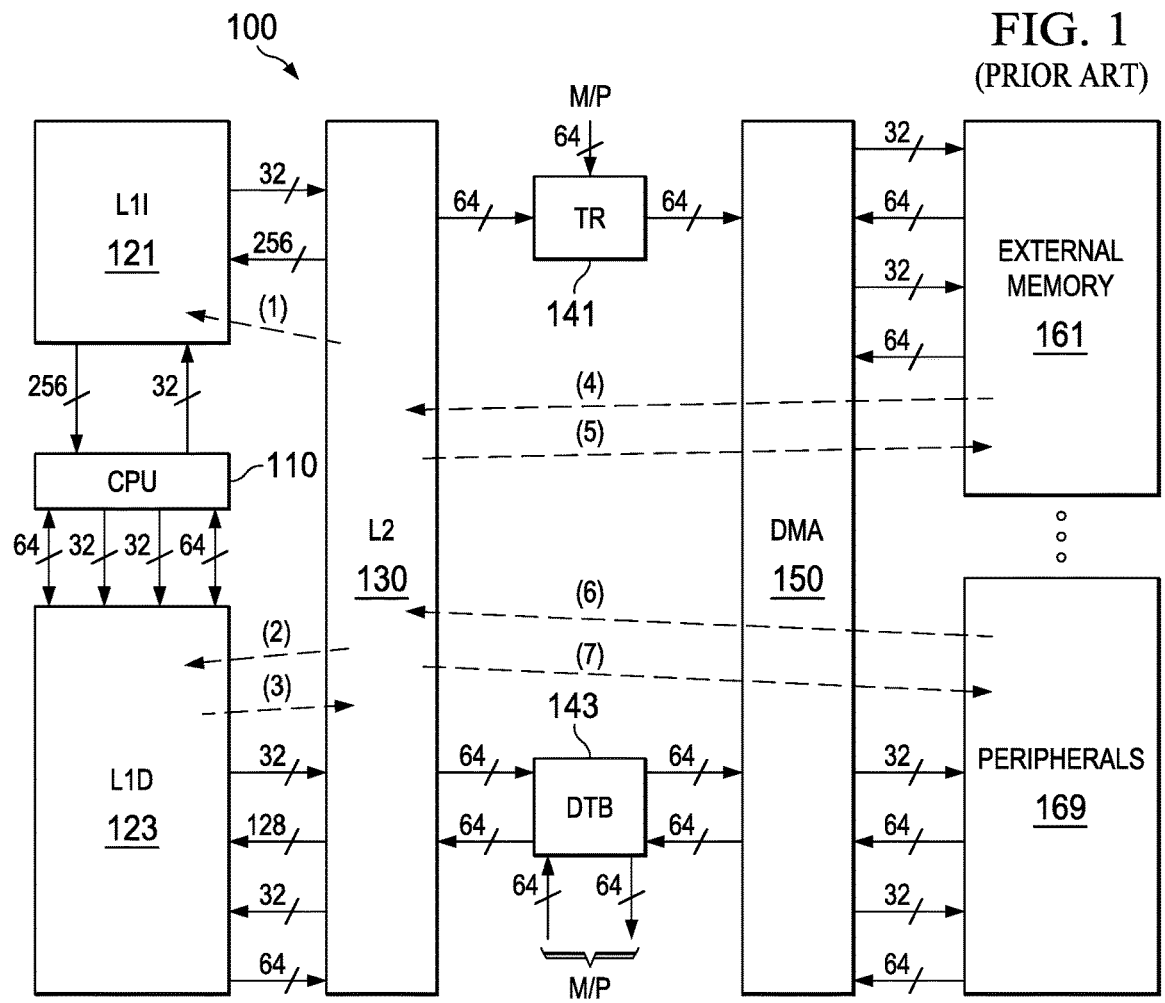
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically include a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
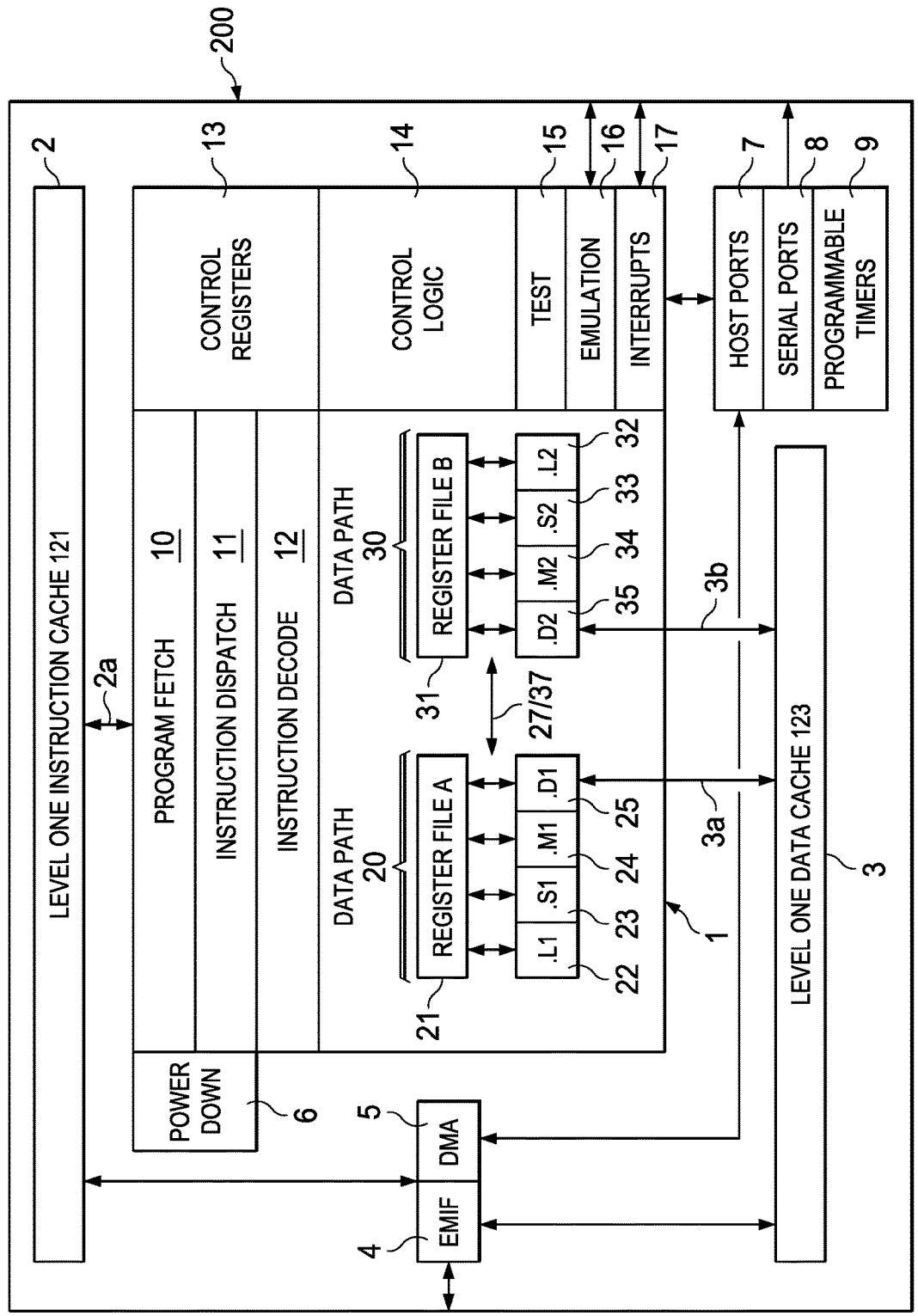
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
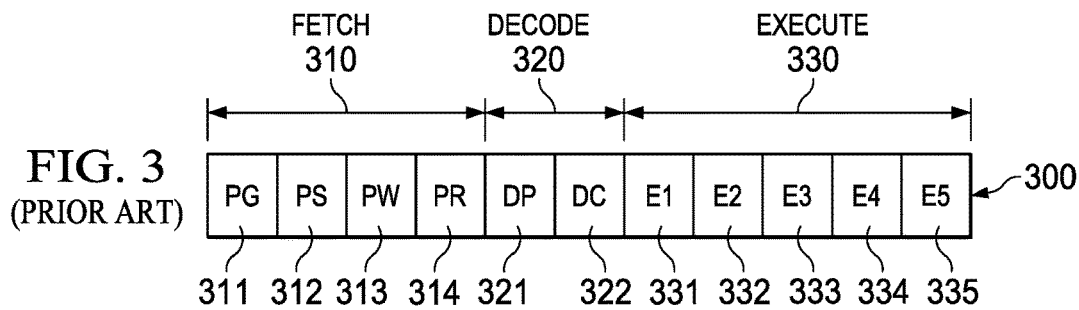
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E1) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

Figures 4, 5:
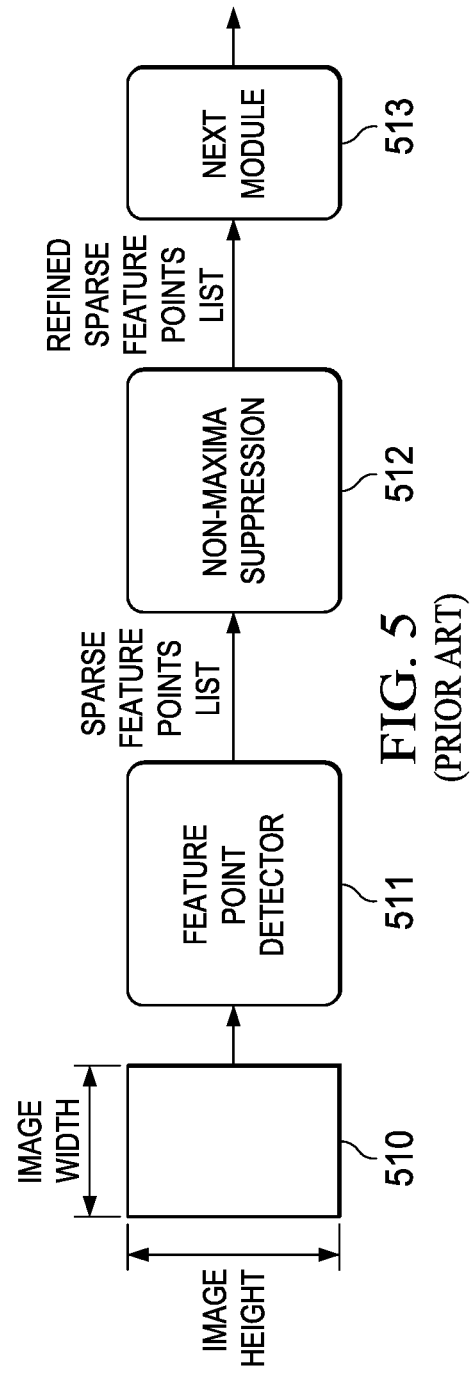
FIG. 4 illustrates the instruction syntax of the very long instruction word digital signal processor core illustrated in FIG. 2 (prior art)
FIG. 5 illustrates a flow diagram of an example of normal flow of a feature point algorithm (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 2 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 2 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 30 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

This invention concerns image feature detection. Many feature point detection algorithms in computer vision employ non-maxima suppression. Non-maxima suppression is generally implemented as a post processing module. Generally a feature point detection module detects many feature points in the vicinity of a real corner in an image. Such corners are generally assumed to be feature points. Feature points which are less reliable and are located near a more reliable feature point should be discarded (non-maxima suppression). The feature point detection generates a corresponding reliability score S for each detected feature point. For the examples in this patent application, a more reliable feature point has a higher reliability score. Prior art feature point detection algorithms generally suppress non-maxima feature points based on these scores.

FIG. 5 shows a flow diagram of a feature point correspondence algorithm according to the prior art. Input image 510 passes to feature detection module 511. Feature detection module 511 detects feature points and reports their corresponding location in x-y coordinates and reliability score. Feature detection module 511 supplies this information to non-maxima suppression module 512 as a sparse feature point list. This sparse list includes data corresponding to only the detected feature points. Non-maxima suppression module 512 selectively suppresses/discards feature points from the original list. As noted above feature points are suppressed if they are less reliable and located near a more reliable feature point. Non-maxima suppression module 512 supplies a new list of feature points with these suppressed feature points omitted to next module 513. Next module 513 applies additional processing to this reduced list of feature points in a manner not relevant to this invention.

Non-maxima suppression is performed in a defined local neighborhood of a current feature point. If the current feature point reliability score is highest (i.e. most reliable) in a particular neighborhood then that feature point is not suppressed. For ease of explanation and for simplicity here consider an 8-way neighborhood (3×3 block) example. This invention is applicable to other neighborhoods but a 3×3 neighborhood is selected for ease of illustration.

Figures 6, 7:
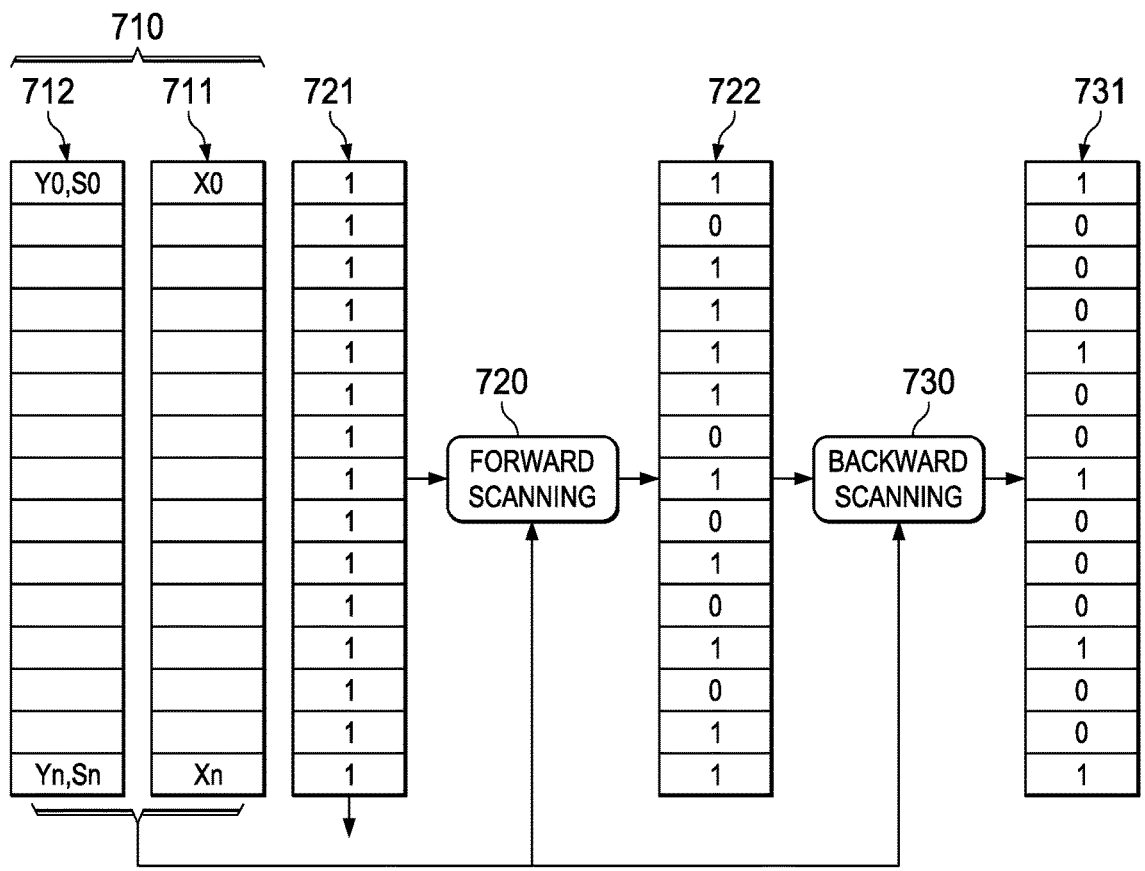
FIG. 6 illustrates the 8 neighboring pixels of a pixel under consideration that helps in understanding this invention.
FIG. 7 illustrates a data flow diagram an example of normal operation of a feature point algorithm according to an embodiment of this invention.

FIG. 6 illustrates an example 8-way neighborhood. As is customary in raster scan arrays, the x coordinate is measured from left to right and the y coordinate in measured from top to bottom. Current feature point 610 is located at center with reliability score S and a coordinate location as (y,x). FIG. 6 also illustrates: top left feature point 611 having a reliability score S_TL at coordinates (y−1,x−1); top feature point 612 having a reliability score S_T at coordinates (y−1,x); top right feature point 613 having a reliability score S_TR at coordinates (y−1,x+1); left feature point 614 having a reliability score S_L at coordinates (y,x−1); right feature point 615 having a reliability score S_R at coordinates (y,x+1);
bottom left feature point 616 having a reliability score S_BL at coordinates (y+1,x−1); bottom feature point 617 having a reliability score S_B at coordinates (y+1,x); and bottom right feature point 618 having a reliability score S_BR at coordinates (y+1,x+1).

The current feature point is valid and retained (not suppressed) if reliability score S is larger than the reliability scores of all 8-way neighbors scores (S_TL, S_T, S_TR, S_L, S_R, S_BL, S_B, S_BR). The current feature point is suppressed and not reported to next module 513 if the corresponding reliability score less than the reliability score of any of its 8-way neighbors. It is possible that a feature point was not detected/reported for one or more of the 8-way neighbor locations. If this is true, then feature point under consideration is not suppressed by any data at that neighbor location.

One of the main problems of sparse non maxima suppression is determination of locality. The input sparse list of detected feature points in raster scan order generally does not provide neighborhood information. As known in the art, raster scan order begins at the top left corner of the image, proceeds along the first row display order to the end of the row, then repeats left to right scan for each succeeding row. For given center feature point, its neighbor feature points location in the original list of feature points is not easily known. Thus for a feature point located at index i in the input list having location coordinates Y and X and score S, it is not easy to determine the index in list for its neighbor feature points if they exist. Because this list is sorted in raster scan order, the top neighbor feature point must have an index less than i. Similar logic applies to top-left and top-right feature point. If a left neighbor feature point is available, then it must be present at index i−1. In conventional method of sparse non-maxima suppression, for every center feature point, all its neighbors need to be searched in the original list of feature points. For each neighbor feature point search, whole list of original feature point needs to be searched from top to bottom. This requires two levels of nested loops, where outer loop will run for each feature point (assuming it as center pixel), and there will be a nested loop for searching its neighbors comparing the score with center feature point score. Nested loops require overhead, which gets further multiplied with total number of feature points in the list (outer loop). It is possible that the total loop overhead cycles may become higher than the total core loop execution cycles. The proposed invention solves this loop overhead problem.

Another problem in conventional sparse non-maxima suppression is that it is possible that some of the neighbors of a center feature point might not be available. Conventional schemes take care of these cases by some conditional code generally including conditional branching. A pipelined processor such as describe with relation to FIGS. 1 to 4 experiences a pipeline hit upon each taken conditional branch. The condition of the conditional branch is evaluated during E1 phase 331. On a conditional branch later instructions in earlier pipeline phase are flushed. The instruction pipeline then restarts at the branch address. This invention avoids such conditional branches by comparing a different quantity than just the reliability score. This invention compares a packed quantity including the y coordinate and the reliability score in a manner described below.

This invention is an efficient implementation of non-maxima suppression module 512 employing a processor based on VLIW architecture such as described above with relation to FIGS. 1 to 4. This invention assumes that the sparse feature points list is sorted in raster scan order.

Conventional feature point detectors provide the detected feature points list in this order. The non-maxima suppression of this invention employs several data structures. The non-maxima suppression of this invention employs two buffers for the input list of feature points. The first buffer stores the x-coordinate of the feature points in a corresponding entry. The second buffer stores the y-coordinate packed with the reliability score value of the corresponding feature point. This invention employs a valid buffer corresponding to the original feature point input list. Each entry in the valid buffer stores either a 1, indicating the corresponding feature point is valid/non-suppressed, or a 0, indicating the corresponding feature point is invalid/suppressed. This valid buffer is used in forming a list of non-suppressed feature points in a manner described below. Finally, this invention employs a working buffer whose parameters and use are described below.

FIG. 7 illustrates the basic processing according to an example of this invention. FIG. 7 illustrates the non-maxima suppression of this invention receives as input original raster scan sorted feature points from the feature point detector 511. This input via memory 710 is in the form of two lists. The first list 711 includes the x coordinate of each detected feature point. The second list 712 includes in a corresponding entry the y coordinate and the reliability score assigned to that feature point. In this example of the invention each of the x and y coordinates are numbers of 16 bits and the reliability score is a number of 16 bits. In this example the y coordinate and the reliability score are packed into a single 32-bit data word. The number of bits needed to express the x and y coordinates are set by the image size. The number of bits needed to express the reliability score depends upon the resolution needed in the non-maxima suppression. As illustrated in FIG. 7, the two lists 711 and 712 form inputs to the non-maxima suppression forward scanning module 720.

FIG. 7 illustrates valid list 721. Valid list 721 is of the same length as lists 711 and 712 having a number of entries equal to the number of feature points. As illustrated in FIG. 7, valid list 721 is initially loaded with all 1s, indicating all feature points are valid/non-suppressed. As described below operation of forward scanning module 720 produces an intermediate valid list 722. Operation of backward scanning module 730 produces a final valid list 731.

This invention employs two sub-modules forward scanning module 720 and backward scanning module 730. Forward scanning module 720 scans the feature point list 711/712 from top to bottom. Referring back to FIG. 6, forward scanning module 720 checks the validity of every feature point 610 for non-maxima suppression with respect to top left neighbor 611, top neighbor 612, top right neighbor 613 and left neighbor 614. Backward scanning module 730 checks the validity of every feature point 610 for non-maxima suppression with respect to right neighbor 615, bottom left neighbor 616, bottom neighbor 617 and bottom right neighbor 618. This invention suppresses the feature point 610 in the final list 731 if the reliability score of any of top left neighbor 611, top neighbor 612, top right neighbor 612, left neighbor 614, right neighbor 615, bottom left neighbor 616, bottom neighbor 617 or bottom right neighbor 618 exceeds the reliability of feature point 610.

Thus this invention splits the non-maxima suppression into two scans or loops. Forward scanning module 720 considers feature points in lists 711 and 712 in a forward direction (raster scan order) comparing the combined y coordinate and reliability score for top left, top, top right and left neighbors to make a suppress/don't suppress decision.

As will be detailed below the comparison employs a working buffer. Following the suppress/don't suppress determination for each feature point, the combined y coordinate and reliability score of that feature point is stored in the working buffer. For each entry in the working buffer, the y coordinate data are the most significant bits and the reliability score data are the least significant bits. This write is not conditioned upon the suppress/don't suppress determination for that feature point. Forward scanning module 720 then proceeds to the next feature point in the raster scan ordered list. Backward scanning module 730 operates similarly except it traverses the feature point list in reverse order comparing the combined y coordinate and reliability score for bottom right, bottom, bottom left and right neighbors to make a suppress/don't suppress decision. The suppress/don't suppress decisions of these two scans are combined to produce the output list with suppressed feature points.

Figure 8:
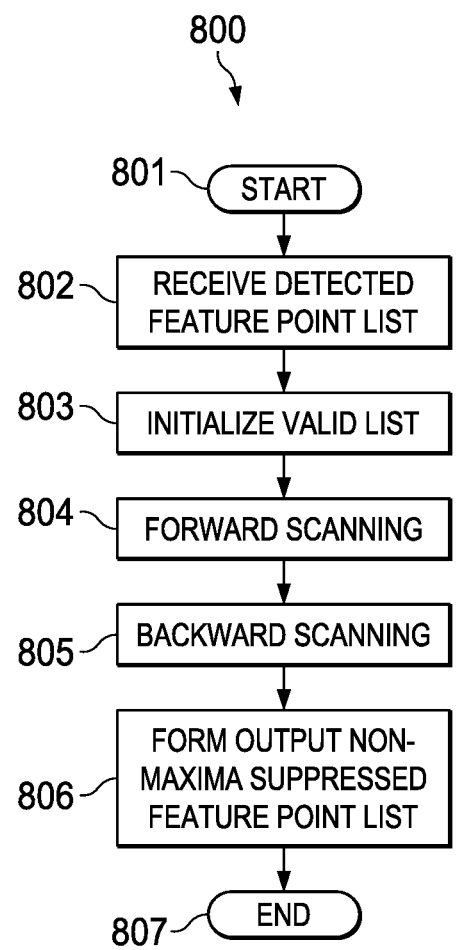
FIG. 8 illustrates a flow diagram of the operation in accordance with an embodiment of this invention.

FIG. 8 illustrates process 800 of this invention. Process 800 begins with start block 801. Process 800 receives the feature points in raster scan order in block 802. Block 802 stores this feature point data in lists 711 and 712 in raster scan order. Block 803 initializes the valid list 721. Valid list 721 is initially loaded with all 1s, indicating all feature points are valid/non-suppressed. Forward scanning 804 scans the input lists in forward raster scan order. Forward scanning 804 generates intermediate valid list 722 indicating feature points to be suppressed as a result of the forward scan. Backward scanning 805 scans the input lists in reverse raster scan order. Backward scanning 805 generates final list 731 indicating feature points to be suppressed as a result of the forward and backward scans. Block 806 forms the output non-maxima suppressed feature point list from the original input lists 711 and 712 and the final valid list 731. A 1 in an entry in final valid list 731 indicates the corresponding feature point in lists 711 and 712 appears in the output non-maxima suppressed feature point list. A 0 in an entry in final valid list 731 indicates the corresponding feature point in lists 711 and 712 does not appear in the output non-maxima suppressed feature point list. Process 800 ends at end block 807.

Figure 9:
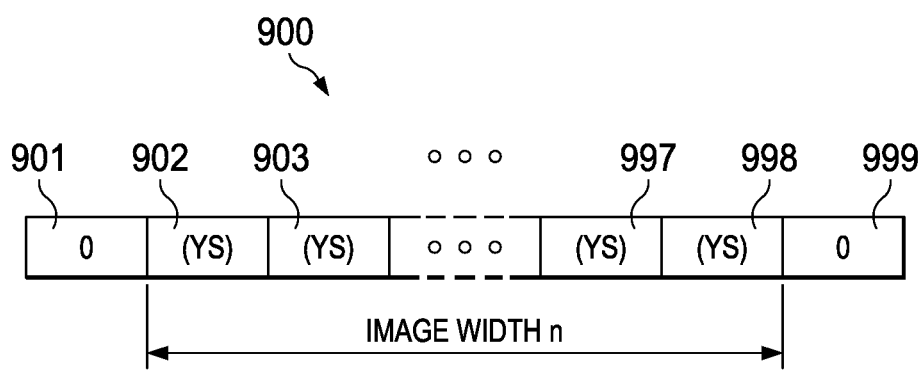
FIG. 9 illustrates use of a working buffer according to an embodiment of this invention.

FIG. 9 illustrates the parameters of the previously mentioned working buffer 900. Working buffer 900 includes plural entries equal to two more than the pixel image width n. FIG. 9 illustrates: first entry 901; plural intermediate entries 902, 903 . . . 997, 998 equal in number to the image width in pixels; and final entry 999. First entry 901 and final entry 999 are used for edge cases in a manner described below. The working buffer stores data corresponding to feature points in lists 711 and 712 following decision on suppress/non-suppress. As seen in FIG. 9 each of the intermediate entries 902, 903 . . . 997, 998 correspond to a column (x coordinate) of the original image. Each entry in working buffer 900 stores the combined y coordinate and reliability score of list 712 (YS) in an entry of the corresponding x coordinate of list 711 of a previously considered feature point. This data is used for non-maxima suppression determination of feature points later in the raster scan order. Working buffer 900 is initialized with data guaranteed to generate a don't suppress decision. First entry 901 and final entry 999 are never overwritten by data from list 712.

Figure 10:
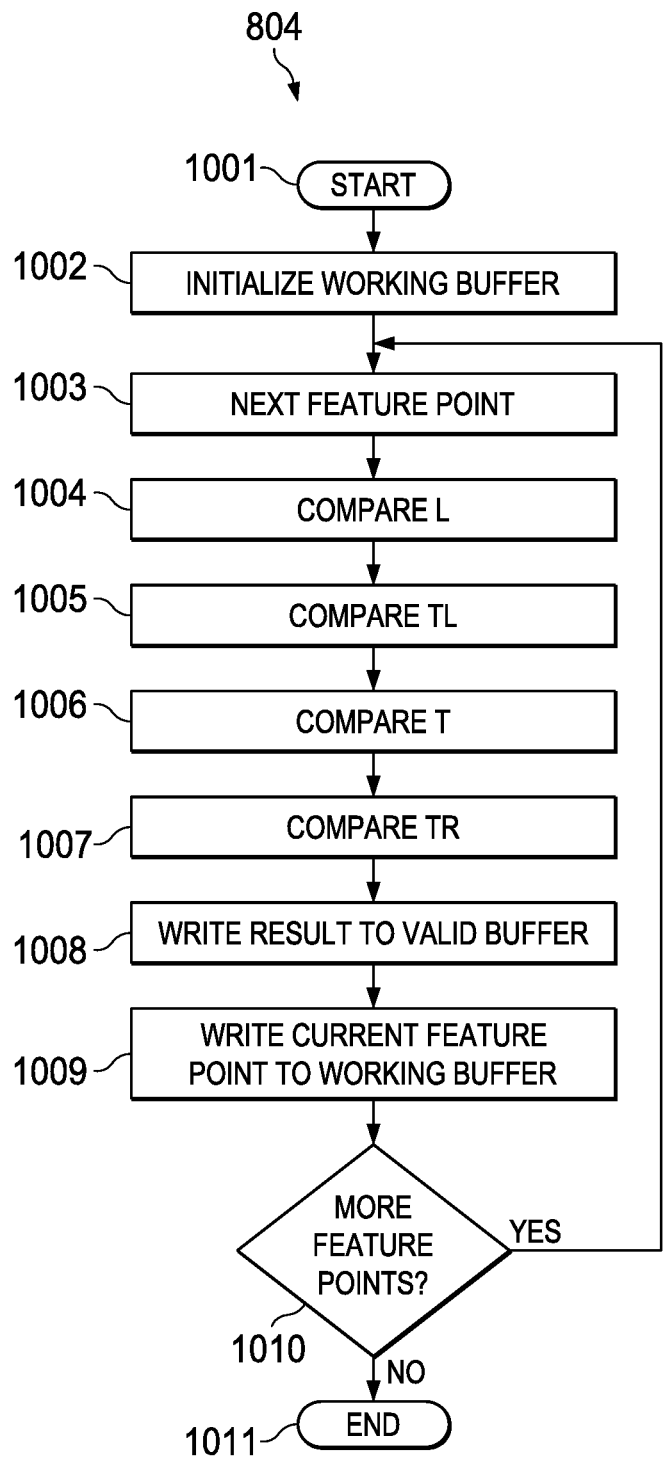
FIG. 10 illustrates a flow diagram of forward scanning, as shown in FIG. 8.

FIG. 10 illustrates an example of the steps of forward scanning block 804. Forward scanning block 804 begins with start block 1001. Forward scanning block 804 initializes working buffer 900 in block 1002. The initial data stored in each entry of working buffer 900 causes a comparison with the combined Y coordinate and reliability score (YS) of any feature point to result in a non-suppress decision. This will be further explained below. Forward scanning block 804 proceeds with the next feature point stored in the combined lists 711 and 712 at block 1003. For the first iteration of this loop the next feature point is the first feature point.

Figure 11:
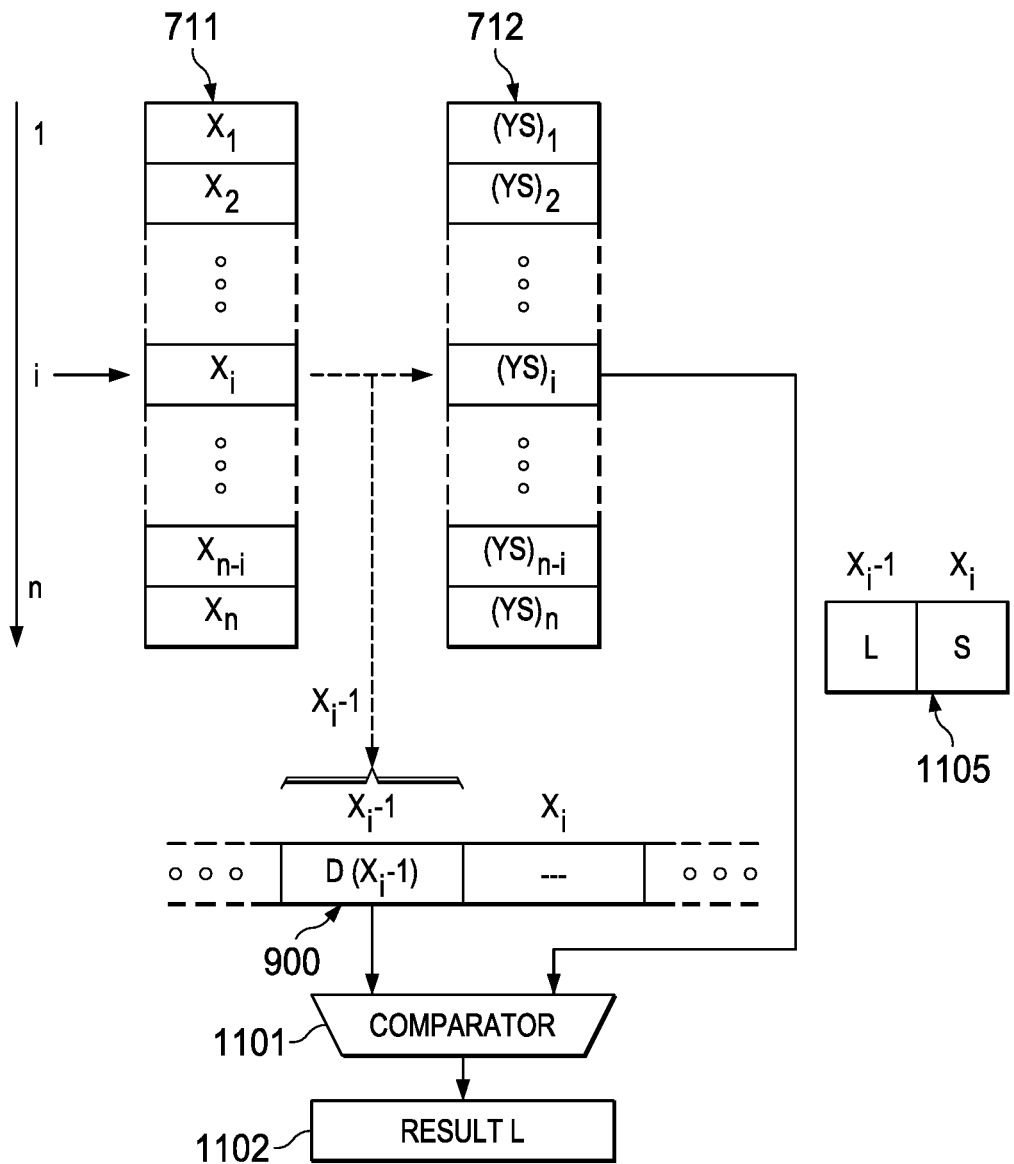
FIG. 11 illustrates data flow in comparing a potential left neighbor feature point with the current feature point in forward scanning.

Forward scanning block 804 then compares the potential left neighbor feature point with the current feature point producing a suppress/don't suppress decision (block 1004). FIG. 11 illustrates this process. The forward scanning block 804 iterates once through the feature points jointly stored in lists 711 and 712. FIG. 10 schematically illustrates iteration in i over a range from the first feature point (i=1) to the last feature point (i=n). Consider an ith iteration. The loop variable i identifies an x coordinate $X_i$ stored in list 711 and the corresponding y coordinate and reliability score $(YS)_i$ stored in list 712. This x coordinate $X_i$ permits identification of a particular entry within working buffer 900 $X_i-1$.

Working buffer 900 stores the left neighbor pixel of the current pixel, if it stores it at all, in the working buffer entry for $X_i-1$. Referring to the insert 1105, which illustrates part of FIG. 6, the current pixel S has an x coordinate of $X_i$. The left neighbor pixel must have an x coordinate of $X_i-1$. FIG. 11 shows comparator 1101 comparing data recalled from an entry corresponding to $X_i-1$ in working buffer 900 with the combined Y coordinate and reliability score $(YS)_i$ of the feature point corresponding to iteration loop variable i.

If the ith feature point has an x coordinate of 1, the first column of the image, then the entry for an x coordinate of $X_i-1$ is first entry 901. First entry 901 is initialized to a value which always yields a don't suppress decision and is never overwritten. Provision of this additional entry outside the image size enables operation without a conditional check whether $X_i$ is the first column of the image. Avoiding conditional checks that require conditional branches avoids the program overhead associated with conditional branches.

The raster scan order of original lists 711 and 712 ensures that this left neighbor pixel feature point, if it exists, is encountered in the algorithm before the current feature point. There are three possibilities of data stored in the entry corresponding to $X_i-1$ within working buffer 900. In the first case, there is no feature point corresponding to the left neighbor of the current feature point and no earlier encountered feature point from the original lists 711 and 712 had an x coordinate equal to $X_i-1$. In this case the data in the entry corresponding to $X_i-1$ continues to store the initialization data (block 1002). As previously stated, comparison with this initialization data always yields a don't suppress result. In the second case, there is no feature point corresponding to the left neighbor of the current feature point but an earlier encountered feature point from the original lists 711 and 712 had an x coordinate equal to $X_i-1$. In this case, due to the raster scan order of the feature point list, the data in the entry corresponding to $X_i-1$ is from a feature point of an earlier row. The data in the entry corresponding to $X_i-1$ in working buffer 900 has a lower y coordinate (earlier row) than the current pixel. Thus the combined y coordinate and reliability score of the current pixel is always higher than the data stored in the selected entry in working buffer 900. Such a comparison result yields a don't suppress result. In the third case, the entry corresponding to $X_i-1$ in working buffer 900 stores data of a true left neighbor of the current feature point. Note that in this case the higher order y coordinates are equal. The comparison determines whether the reliability score of the left neighbor feature point is greater than the reliability score of the current feature point. This comparison result determines the suppress/don't suppress decision.

Figure 12:
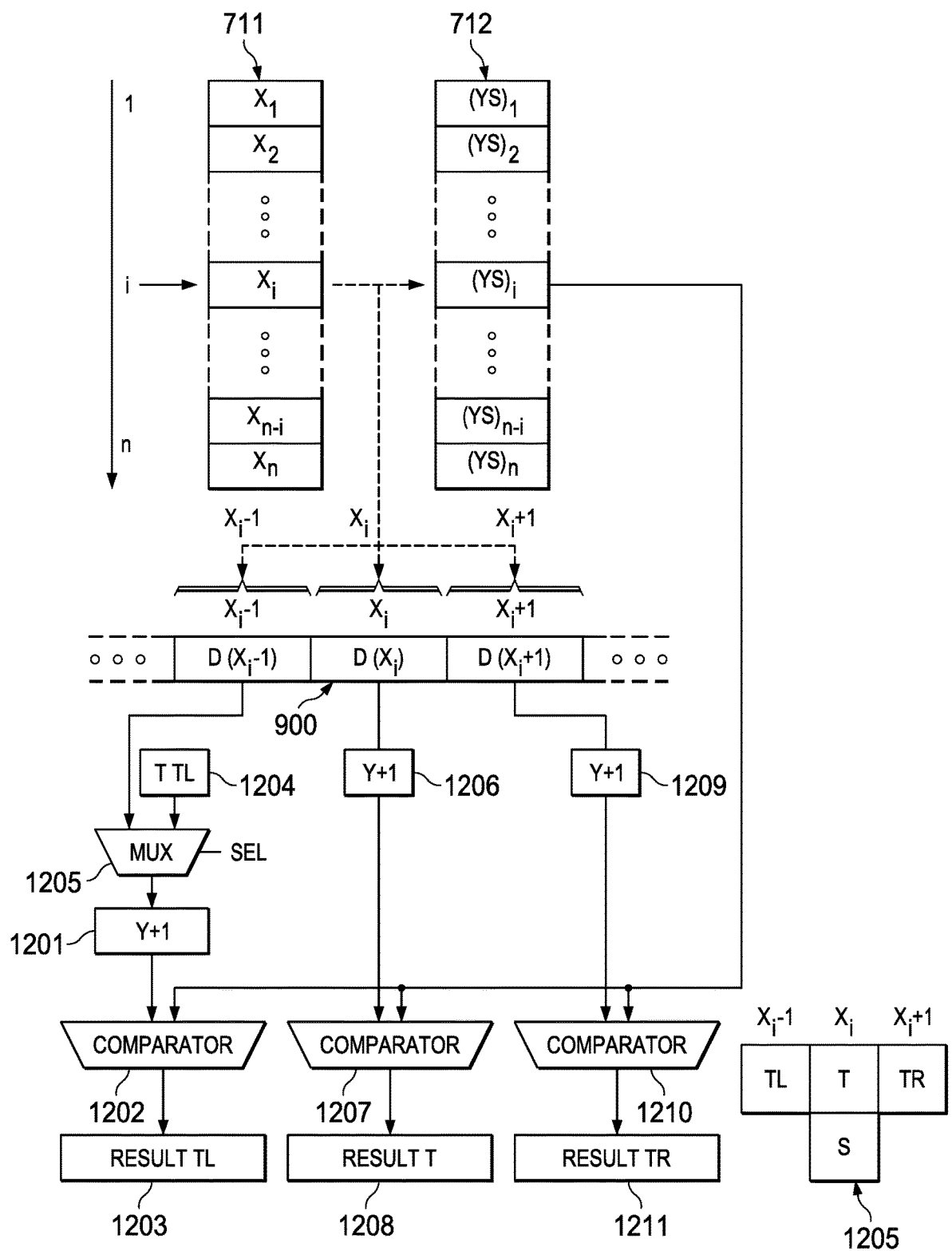
FIG. 12 illustrates data flow comparing a potential top left neighbor feature point, a potential top neighbor feature point, and a potential top right neighbor feature point with the current feature point in forward scanning.

Forward scanning block 804 then compares the potential top left neighbor feature point with the current feature point (block 1005), the potential top neighbor feature point with the current feature point (block 1006) and the potential top right neighbor feature point with the current feature point (block 1007). FIG. 12 illustrates these processes together. In FIG. 12, the loop variable i identifies an x coordinate $X_i$ stored in list 711 and the corresponding y coordinate and reliability score $(YS)_i$ stored in list 712. This x coordinate $X_i$ permits identification of three entries within working buffer 900 $X_i-1$, $X_i$ and $X_i+1$.

Working buffer 900 stores the top left neighbor pixel of the current pixel, if it stores it at all, in the working buffer entry for $X_i-1$. Working buffer 900 stores the top neighbor pixel of the current pixel, if it stores it at all, in the working buffer entry for $X_i$. Working buffer 900 stores the top right neighbor pixel of the current pixel, if it stores it at all, in the working buffer entry for $X_i+1$. Referring to the insert 1215, which illustrates part of FIG. 6, the current pixel S has an x coordinate of $X_i$. The top left neighbor pixel must have an x coordinate of $X_i-1$. The top neighbor pixel must have an x coordinate of $X_i$. The top right neighbor pixel must have an x coordinate of $X_i+1$. The x coordinate of the ith entry in list 711 permits identification of the working buffer 900 entries for $X_i-1$, $X_i$ and $X_i+1$ as shown in FIG. 12. Referring to FIG. 6, each of top left, top and top right neighbors have a y coordinate one less than the y coordinate of the current pixel. Accordingly, each of the data words recalled from working buffer 900 have their y coordinates incremented by 1 (Y+1 blocks 1201, 1206 and 1209).

Ignoring for the moment temporary top left (T TL) register 1204 and multiplexer 1205, comparator 1202 compares data recalled from an entry corresponding to $X_i-1$ in working buffer 900 (with its y coordinate incremented by block 1201) with the combined Y coordinate and reliability score $(YS)_i$ of the feature point corresponding to iteration loop variable i. Similarly, comparator 1207 compares data recalled from an entry corresponding to $X_i$ in working buffer 900 (with its y coordinate incremented by block 1206) with the combined Y coordinate and reliability score $(YS)_i$. Likewise, comparator 1210 compares data recalled from an entry corresponding to $X_i+1$ in working buffer 900 (with its y coordinate incremented by block 1209) with the combined Y coordinate and reliability score $(YS)_i$. Each of these comparisons has the same three cases as noted above. Each comparator result is a don't suppress decision if the corresponding data in working buffer 900 is not a feature point. Each comparator result causes a don't suppress decision if the corresponding data in working buffer 900 is a feature point from a prior row and not the neighbor pixel. Each comparator result is an appropriate suppress/don't suppress decision if the data in the corresponding entry in working buffer 900 is a true neighbor feature point.

As discussed above, if the ith feature point has an x coordinate of 1 (left edge of image), then the entry for an x coordinate of $X_i-1$ is first entry 901. First entry 901 is initialized to a value which always yields a don't suppress decision and is never overwritten. Providing the extra entry avoids checking code for this condition. Additionally if the ith feature point has an x coordinate of n (right edge of image), then the entry for an x coordinate of $X_i+1$ is final entry 999. Final entry 999 is initialized to a value which always yields a don't suppress decision and is never overwritten. Providing the extra entry avoids checking code for this condition.

Temporary top left (T TL) register 1204 and multiplexer 1205 are used in a special case where writing the current feature point YS data to working buffer 900 would overwrite potential top left neighbor data for a next feature point. As described below, the end of forward scanning block 804 includes writing (YS)$_i$ data of the current feature point to buffer memory 900 at the entry corresponding to X$_i$. This overwrites data of a top left neighbor to a potential next feature point at (Y$_i$,X$_i$+1). On each top determination, the top data is stored in temporary top left (T TL) register 1204. Upon comparison of the potential top left neighbor if X$_{i-1}$+1=X$_i$ and Y$_{i-1}$=Y$_i$, then writing the prior feature point to working buffer 901 overwrote the potential top left neighbor of the current pixel. Under these conditions, multiplexer 1205 selects data from temporary top left (T TL) register 1204 for comparator 1202. Under all other conditions, multiplexer 1205 selects data from entry X$_i$−1.

A practical implementation of this invention on a digital signal processor system 100 such as described in conjunction with FIGS. 1 to 4 need not require an additional hardware register to implement temporary top left (T TL) register 1204. A typical manner to implement the comparisons of comparators 1101, 1202, 1207 and 1210 employs one of functional units L1 unit 22, S1 unit 23, D1 unit 25, L2 unit 32, S2 unit 33, or D2 unit 35. The compared quantities are stored in a corresponding register file 21 or 31. Thus potential top left neighbor data from working buffer 900 would already be stored in a data register of one of register files 21 or 31. Preserving this potential top left neighbor data for the next considered feature point merely requires not reusing this register before determining the special case (X$_{i-1}$=X$_i$ and Y$_{i-1}$=Y$_i$) is applicable and the data reused if applicable.

Following the four neighbor determinations (blocks 1004, 1005, 1006 and 1007), block 1008 updates the corresponding entry in intermediate valid buffer 722. The generation of a suppress result by any of comparators 1101, 1202, 1207 or 1210 means that the current feature point should be suppressed. A suppress result for that feature point is stored by writing a 0 into the corresponding entry in intermediate valid buffer 722. This could be accomplished using a conditional instruction. The results of the comparison is stored in one of the registers available to control conditional operations (Table 1). A write of a 0 to the ith entry of intermediate valid buffer 722 is conditioned on this register. The condition is set relative to the comparison result to write the 0 upon determination of a suppress decision and not write upon determination of a don't suppress decision. This can be performed independently for the four determinations. Thus if any neighbor feature point generates a suppress decision that is reflected in the ith entry of the intermediate valid buffer 722. The original 1 in the entry of the valid buffer 722 is retained only if no neighbor feature point comparison generates a suppress decision.

Forward scanning block 804 then writes the current feature point (YS)$_i$ data into the entry in working buffer 900 corresponding to the x coordinate X$_i$ (block 1009). This write is independent of any suppress/don't suppress decision and always occurs. This makes the current feature point available for neighbor comparison for the next feature point.

Forward scanning block 804 then determines if there are any more feature points of the original lists 711 and 712 (test block 1010). If there are additional feature points, forward scanning block 804 returns to block 1003 to consider the next feature point. This typically includes incrementing the loop variable i to point to the next feature point in lists 711 and 712. Forward scanning block 804 repeats the suppress/don't suppress decisions of blocks 1004, 1005, 1006 and 1007, updates the valid buffer (block 1008) and stores the current feature point data in working buffer 900 (block 1009). This process repeats until all original feature points are considered. When decision block 1010 determines all the original feature points have been considered, forward scanning block 804 ends at end block 1011.

Figure 13:
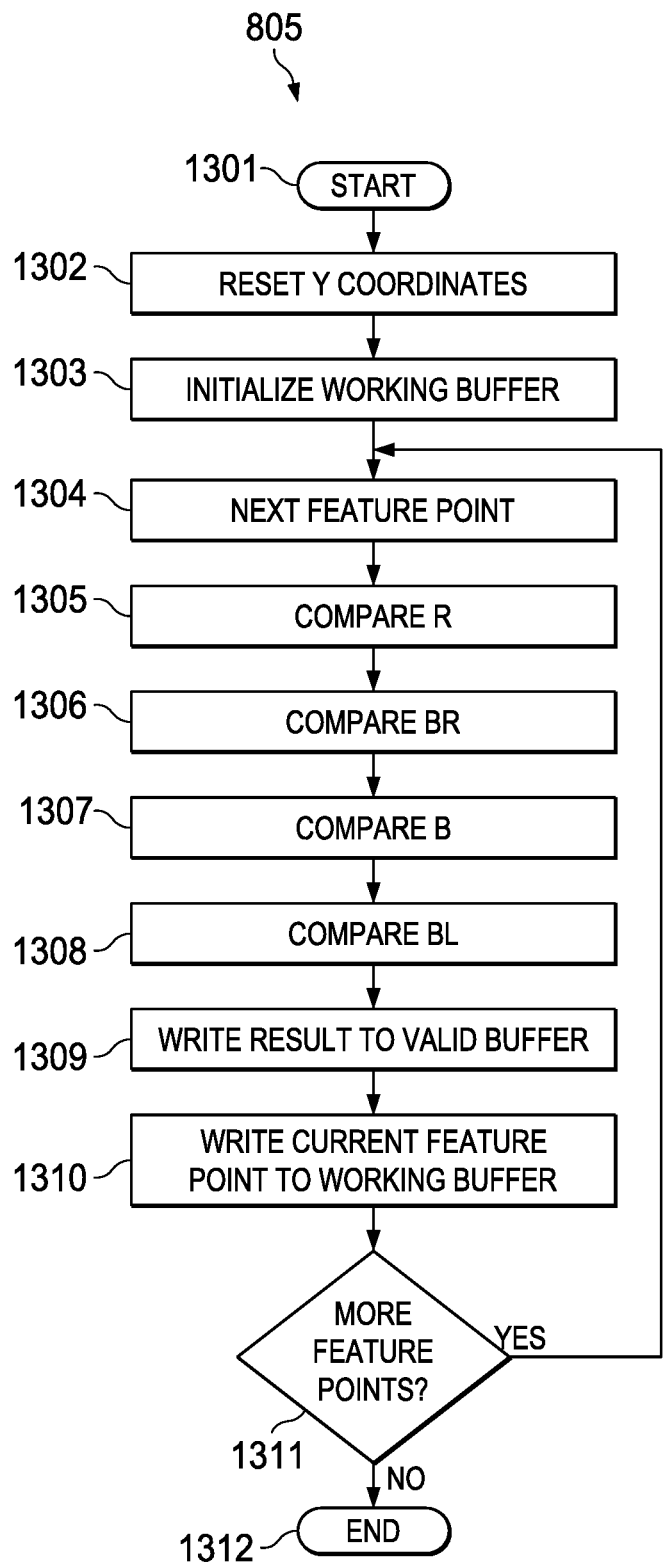
FIG. 13 illustrates a flow diagram of backward scanning, as shown in FIG. 8.

Referring back to FIG. 8, process 800 proceeds to backward scanning block 805. FIG. 13 illustrates an example of the steps of backward scanning block 805. Backward scanning block 805 begins with start block 1301. Backward scanning block 805 resets the y coordinates in list 712 in block 1302. This y coordinate reset is needed for the comparisons to operate correctly for non-maxima suppressor. Block 1302 replaces each original y coordinate Y$_{org}$ in list 722 with a new y coordinate Y$_{new}$ as follows:

$$Y_{new} = \text{ImageHeight} + 1 - Y_{org}$$

Backward scanning block 804 initializes working buffer 900 in block 1303. The initial data stored in each entry of working buffer 900 causes a comparison with the combined Y coordinate and reliability score (YS) of any feature point to result in a non-suppress decision. This will be further explained below. Backward scanning block 805 proceeds with the next feature point stored in the combined lists 711 and 712 at block 1304. For the first iteration of this loop the next feature point is the first feature point.

Figure 14:
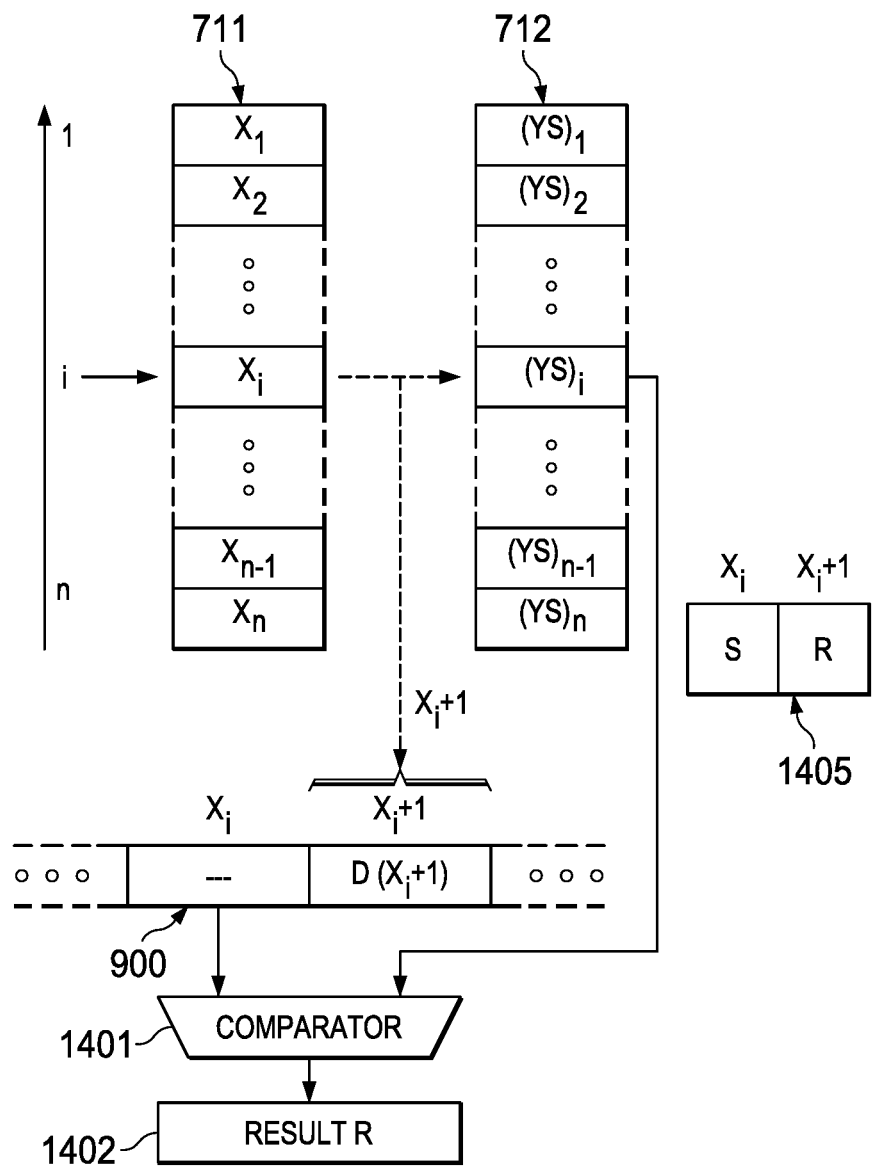
FIG. 14 illustrates data flow in comparing a potential right neighbor feature point with the current feature point in backward scanning.

Backward scanning block 805 then compares the potential right neighbor feature point with the current feature point producing a suppress/don't suppress decision (block 1305). FIG. 14 illustrates this process. The backward scanning block 805 iterates once through the feature points jointly stored in lists 711 and 712. FIG. 14 schematically illustrates backward iteration in i over a range from the last feature point (i=n) to the first feature point (i=1). Consider an ith iteration. The loop variable i identifies an x coordinate X$_i$ stored in list 711 and the corresponding y coordinate and reliability score (YS)$_i$ stored in list 712. This x coordinate X$_i$ permits identification of a particular entry within working buffer 900 X$_i$+1.

Working buffer 900 stores the right neighbor pixel of the current pixel, if it stores it at all, in the working buffer entry for X$_i$+1. Referring to the insert 1405, which illustrates part of FIG. 6, the current pixel S has an x coordinate of X$_i$. The right neighbor pixel must have an x coordinate of X$_i$1. FIG. 14 shows comparator 1401 comparing data recalled from an entry corresponding to X$_i$+1 in working buffer 900 with the combined Y coordinate and reliability score (YS)$_i$ of the feature point corresponding to iteration loop variable i.

If the ith feature point has an x coordinate of n, the last column of the image, then the entry for an x coordinate of X$_i$+1 is last entry 999. Last entry 999 is initialized to a value which always yields a don't suppress decision and is never overwritten. Provision of this additional entry outside the image size enables operation without a conditional check whether X$_i$ is the last column of the image. Avoiding conditional checks that require conditional branches avoids the program overhead associated with conditional branches.

The raster scan order of original lists 711 and 712 ensures that this right neighbor pixel feature point, if it exists, is encountered in the algorithm before the current feature point. There are three possibilities of data stored in the entry corresponding to X$_i$+1 within working buffer 900. In the first case, there is no feature point corresponding to the right neighbor of the current feature point and no earlier encountered feature point from the original lists 711 and 712 had an x coordinate equal to X$_i$+1. In this case the data in the entry corresponding to X$_i$+1 continues to store the initialization data (block 1303). As previously stated, comparison with this initialization data always yields a don't suppress result. In the second case, there is no feature point corresponding to the right neighbor of the current feature point but an earlier encountered feature point from the original lists 711 and 712 had an x coordinate equal to $X_i+1$. In this case, due to the raster scan order of the feature point list, the data in the entry corresponding to $X_i+1$ is from a feature point of a later row in the original image. The reset of Y coordinates of block 1302 ensures the data in the entry corresponding to $X_i+1$ in working buffer 900 has a lower y coordinate (later row) than the current pixel. Thus the combined y coordinate and reliability score of the current pixel is always higher than the data stored in the selected entry in working buffer 900. Such a comparison result yields a don't suppress result. In the third case, the entry corresponding to $X_i+1$ in working buffer 900 stores data of a true right neighbor of the current feature point. Note that in this case the higher order y coordinates are equal. The comparison determines whether the reliability score of the right neighbor feature point is greater than the reliability score of the current feature point. This comparison result determines the suppress/don't suppress decision.

Figure 15:
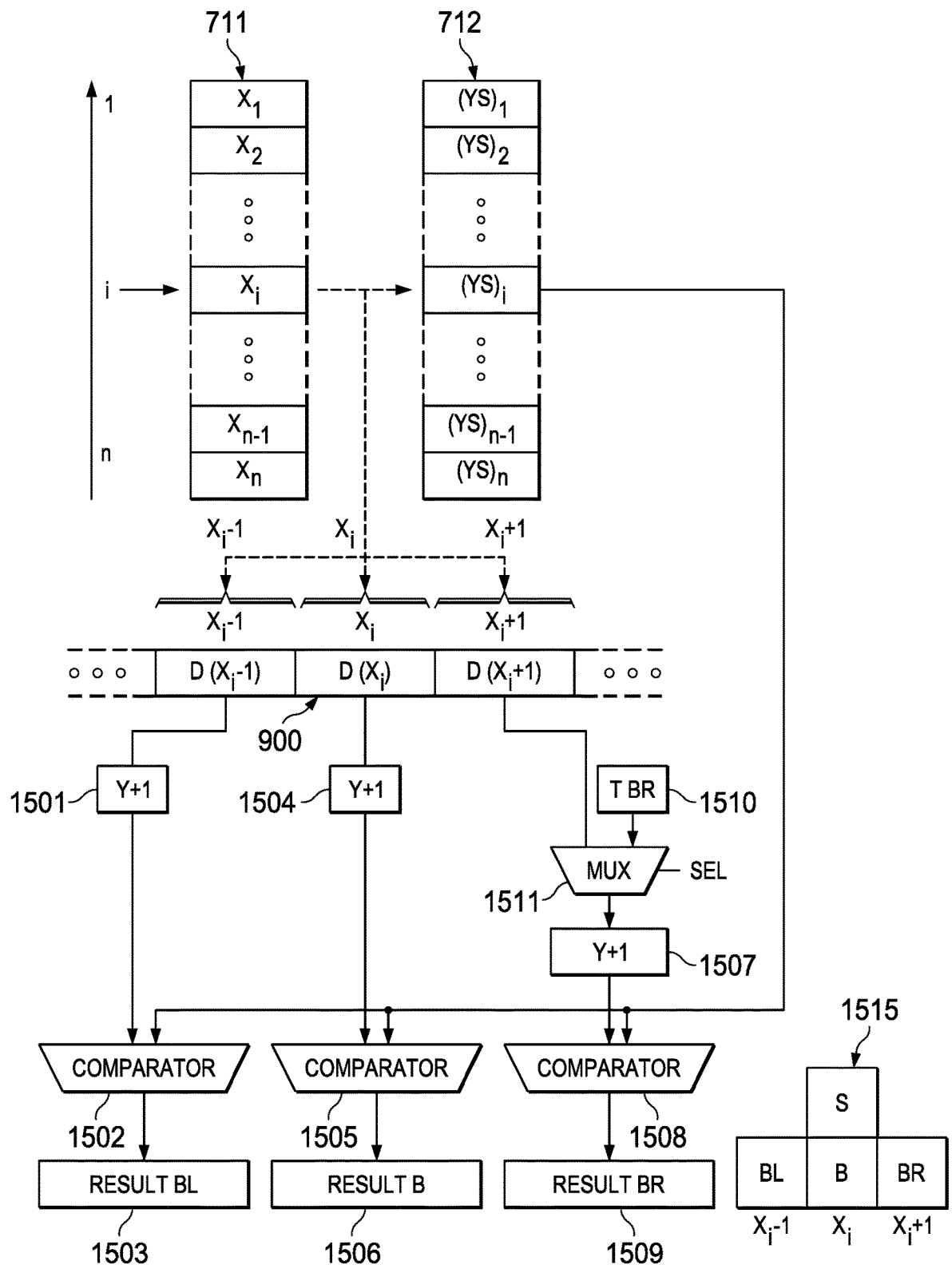
FIG. 15 illustrates data flow in comparing a potential bottom right neighbor feature point, a potential bottom neighbor feature point, and a potential bottom left neighbor feature point with the current feature point in backward scanning.

Backward scanning block 805 then compares the potential bottom right neighbor feature point with the current feature point (block 1306), the potential bottom neighbor feature point with the current feature point (block 1307) and the potential bottom left neighbor feature point with the current feature point (block 1308). FIG. 15 illustrates these processes together. In FIG. 15, the loop variable i identifies an x coordinate $X_i$ stored in list 711 and the corresponding y coordinate and reliability score $(YS)_i$ stored in list 712. This x coordinate $X_i$ permits identification of three entries within working buffer 900 $X_i-1$, $X_i$ and $X_i+1$.

Working buffer 900 stores the bottom right neighbor pixel of the current pixel, if it stores it at all, in the working buffer entry for $X_i+1$. Working buffer 900 stores the bottom neighbor pixel of the current pixel, if it stores it at all, in the working buffer entry for $X_i$. Working buffer 900 stores the bottom left neighbor pixel of the current pixel, if it stores it at all, in the working buffer entry for $X_i-1$. Referring to the insert 1515, which illustrates part of FIG. 6, the current pixel S has an x coordinate of $X_i$. The bottom right neighbor pixel must have an x coordinate of $X_i+1$. The bottom neighbor pixel must have an x coordinate of $X_i$. The bottom right neighbor pixel must have an x coordinate of $X_i-1$. The x coordinate of the ith entry in list 711 permits identification of the working buffer 900 entries for $X_i-1$, $X_i$ and $X_i+1$ as shown in FIG. 15. Referring to FIG. 6, each of bottom right, bottom and bottom left neighbors have a y coordinate one less than the y coordinate of the current pixel (required by the reset of Y coordinates of block 1302). Accordingly, each of the data words recalled from working buffer 900 have their y coordinates incremented by 1 (Y+1 blocks 1501, 1504 and 1507).

Ignoring for the moment temporary bottom right (T BR) register 1510 and multiplexer 1511, comparator 1508 compares data recalled from an entry corresponding to $X_i+1$ in working buffer 900 (with its y coordinate incremented by block 1507) with the combined Y coordinate and reliability score $(YS)_i$ of the feature point corresponding to iteration loop variable i. Similarly, comparator 1505 compares data recalled from an entry corresponding to $X_i$ in working buffer 900 (with its y coordinate incremented by block 1504) with the combined Y coordinate and reliability score $(YS)_i$. Likewise, comparator 1502 compares data recalled from an entry corresponding to $X_i-1$ in working buffer 900 (with its y coordinate incremented by block 1209) with the combined Y coordinate and reliability score $(YS)_i$. Each of these comparisons have the same three cases as noted above. Each comparator result is a don't suppress decision if the corresponding data in working buffer 900 is not a feature point. Each comparator result causes a don't suppress decision if the corresponding data in working buffer 900 is a feature point from a prior row and not the neighbor pixel. Each comparator result is an appropriate suppress/don't suppress decision if the data in the corresponding entry in working buffer 900 is a true neighbor feature point.

As discussed above, if the ith feature point has an x coordinate of 1 (left edge of image), then the entry for an x coordinate of $X_i-1$ is first entry 901. First entry 901 is initialized to a value which always yields a don't suppress decision and is never overwritten. Providing the extra entry avoids checking code for this condition. Additionally if the ith feature point has an x coordinate of n (right edge of image), then the entry for an x coordinate of $X_i+1$ is final entry 999. Final entry 999 is initialized to a value which always yields a don't suppress decision and is never overwritten. Providing the extra entry avoids checking code for this condition.

Temporary bottom right (T BR) register 1510 and multiplexer 1511 are used in a special case where writing the current feature point YS data to working buffer 900 would overwrite potential bottom right neighbor data for the next feature point. As described below, the end of backward scanning block 805 includes writing $(YS)_i$ data of the current feature point to buffer memory 900 at the entry corresponding to $X_i$. This overwrites data of a bottom right neighbor to a potential next feature point at $(Y_i, X_i+1)$. On each bottom determination the bottom data is stored in temporary bottom right (T BR) register 1510. Upon comparison of the potential bottom left neighbor if $X_{i-1}+1=X_i$ and $Y_{i-1}=Y_i$, then writing the prior feature point to working buffer 901 overwrote the potential bottom right neighbor of the current pixel. Under these conditions, multiplexer 1511 selects data from temporary bottom right (T BR) register 1510 for comparator 1508. Under all other conditions, multiplexer 1511 selects data from entry $X_i+1$.

A practical implementation of this invention on a digital signal processor system 100 such as described in conjunction with FIGS. 1 to 4 need not require an additional hardware register to implement temporary bottom right (T BR) register 1510. A typical manner to implement the comparisons of comparators 1401, 1502, 1505 and 1508 employs one of functional units L1 unit 22, S1 unit 23, D1 unit 25, L2 unit 32, S2 unit 33, or D2 unit 35. The compared quantities are stored in a corresponding register file 21 or 31. Thus potential bottom right neighbor data from working buffer 900 would already be stored in a data register of one of register files 21 or 31. Preserving this potential bottom right neighbor data for the next considered feature point merely requires not reusing this register before determining the special case $(X_{i-1}+1=X_i$ and $Y_{i-1}=Y_i)$ is applicable and the data reused if applicable.

Following the four neighbor determinations (blocks 1305, 1306, 1307 and 1308), block 1309 updates the corresponding entry in intermediate valid buffer 722. The generation of a suppress result by any of comparators 1401, 1502, 1505 or 1508 means that the current feature point should be suppressed. A suppress result for that feature point is stored by writing a 0 into the corresponding entry in intermediate valid buffer 722. This could be accomplished using a conditional instruction. The results of the comparison is stored in one of the registers available to control conditional operations (Table 1). A write of a 0 to the ith entry of intermediate valid buffer 722 is conditioned on this register. The condition is set relative to the comparison result to write the 0 upon determination of a suppress decision and not write upon determination of a don't suppress decision. This can be performed independently for the four determinations. Thus if any neighbor feature point generates a suppress decision that is reflected in the ith entry of the intermediate valid buffer 722. The original 1 in the entry of the valid buffer 722 is retained only if no neighbor feature point comparison generates a suppress decision.

Backward scanning block 805 then writes the current feature point $(YS)_i$ data into the entry in working buffer 900 corresponding to the x coordinate $X_i$ (block 1310). This write is independent of any suppress/don't suppress decision and always occurs. This makes the current feature point available for neighbor comparison for the next feature point.

Backward scanning block 805 then determines if there are any more feature points of the original lists 711 and 712 (test block 1311). If there are additional feature points, backward scanning block 805 returns to block 1304 to consider the next feature point. This typically includes incrementing the loop variable i to point to the next feature point in lists 711 and 712. Backward scanning block 805 repeats the suppress/don't suppress decisions of blocks 1305, 1306, 1307 and 1308, updates the valid buffer (block 1309) and stores the current feature point data in working buffer 900 (block 1310). This process repeats until all original feature points are considered. When decision block 1311 determines all the original feature points have been considered, backward scanning block 805 ends at end block 1312.

Referring back to process 800 illustrated in FIG. 8, following execution of backward scanning 804, process 800 forms the output suppressed list of feature points in block 806. This may be performed as shown in the code fragment below. In this code fragment: i is an iteration variable similar to that disclosed in conjunction with FIGS. 11 and 12; V is the final valid list 731 such as illustrated in FIG. 7; j is an iteration variable for the suppressed list; X is the list of x coordinates as stored in list 711; YS is the list of combined y coordinates and reliability scores as stored in list 712; L is the output list of not suppressed feature points; and m is the number of valid entries in output list L, the number of not suppressed feature points. Iteration variable i is initialized to 1, iteration variable j is initialized to 0; list L is initializes as empty. For this code fragment example, YS is in the original y coordinate order. Either the original list order is retained or the process reverses the reset of Y coordinates of step 1302.

```
for i=1 to i=n
    If V_i = 1
        then increment j
            move X_i and (YS)_i to L_j
    Next i
    m = j
```

The code fragment iterates over i from i=1 to 1=n. For each i, the IF statement determines if $V_i$ is 1. If this is true, then the corresponding feature point is not suppressed and should appear in the output list. The first THEN statement increments the iteration variable j to point to the next entry in output list L. The second THEN statement moves the x coordinate data $X_i$ and the combined y coordinate and reliability score $(YS)_i$ to the jth entry of the output list L. Following execution of the THEN statements, the code proceeds to the next i.

If the IF statement is not true, then the corresponding feature point is to be suppressed and not placed in output list L. The code skips the move and increment j statements and proceeds to the next i. Following iteration of i to n, m is set to j, the number of entries in list L. Thus the code fragment iterates over n considering all original detected feature points. Non-suppressed feature points are stored in the output list L, suppressed feature points are not.

Depending upon use, there may not be a need to include the reliability score S of each feature point in the output list L. In this event, the move instruction within the THEN clause would move only the x coordinates and the y coordinates. Because the y coordinates occupy fixed bits within list 712, extraction of these y coordinates is easy.

Those skilled in the art would realize that many steps in this maxima suppression can be practiced in a Single Instruction, Multiple Data (SIMD) manner. In particular the combined y coordinate and reliability score comparisons as suitable for SIMD operation. This is because the comparisons performed for a single feature point at a time do not interfere with each other, they are independent.

Another possible SIMD technique could operate upon M plural feature points simultaneously. This involves: recalling M feature points simultaneously from the from the original feature point list; making M corresponding left comparisons simultaneously (for the forward scan); adding 1 to each of M corresponding potential top left feature points using a SIMD add with the bits corresponding to the reliability score portion of each lane equal to 0; making M corresponding top left comparisons simultaneously (for the forward scan); adding 1 to each of M corresponding potential top feature points; making M corresponding top comparisons simultaneously (for the forward scan); adding 1 to each of M corresponding potential top right feature points; making M corresponding top right comparisons simultaneously (for the forward scan); and storing the M current feature points to the working buffer simultaneously. Each of these steps could be practiced simultaneously via an M width SIMD operation. There is a possibility that this SIMD operation would not operate perfectly. Assume operation upon 4 feature points simultaneously via a SIMD vector V=(Y1S1,Y2S2,Y3S3,Y4S4). It is possible that for one feature point, such as Y4S4, a potential top, top left or top right neighbor might be present in the vector V and not yet stored in the working buffer. In this case, the comparison would yield a not suppress result that may be incorrect. Thus a feature point that should be suppressed may not be suppressed. In an image sparsely populated with feature points, this situation is relatively unlikely. The hazard (possible incorrect not suppress result) may be a low risk. Thus the SIMD advantage of cycle saving in processing may outweigh the hazard.

This invention includes several key concepts. Use of the working buffer for temporary data storage of the neighbor comparisons is advantageous. The arrangement of the working buffer together with the raster scan order of the original feature point list enables easy determination of where neighbor data is stored if there is a neighbor feature point. Combining the y coordinate data in the working buffer and in the comparison enables seamless determination if the data is relevant. If the data is not relevant, either because there is no relevant feature point data stored or the feature point is from a distant y coordinate, the combined comparison generates the desired not-suppress result. If the data is relevant, the comparison yields the desired result. Splitting the process into forward and backward scans enables proper handling of two subsets of potential neighbor feature points. Forward scanning handles left, top left, top and top right potential neighbors. Backward scanning handles right, bottom right, bottom and bottom left potential neighbors. The algorithm includes two loops and no nested loops as would be required by the prior art.

What is claimed is:

1. A method comprising:
receiving a list of feature points of an image, wherein each feature point corresponds to a pixel of the image and has properties including an x-coordinate, a y-coordinate, and a reliability score;
initializing a valid list, the initialized valid list indicating that all of the feature points of the list are non-suppressed feature points;
performing a first scan of the list of feature points in a first direction in which, for each feature point, at least one property of the feature point is compared a corresponding property of each of a first plurality of feature points, wherein each of the first plurality of feature points correspond to a respective one of a first plurality of pixels, and wherein each of the first plurality of pixels neighbor the pixel to which the feature point corresponds;
updating the valid list in response to the first scan to obtain an intermediate valid list;
performing a second scan of the list of feature points in a second direction in which, for each feature point, at least one property of the feature point is compared a corresponding property of each of a second plurality of feature points, wherein each of the second plurality of feature points correspond to a respective one of a second plurality of pixels, and wherein each of the second plurality of pixels neighbor the pixel to which the feature point corresponds;
updating the intermediate valid list in response to the second scan to obtain a final valid list, wherein the final valid list indicates that at least one of the feature points of the list is to be suppressed; and
generating a non-maxima suppressed feature point list that includes only feature points from the list that the final valid list indicates are not to be suppressed.

2. The method of claim 1, wherein the at least one property of the feature point is the y-coordinate and the reliability score.

3. The method of claim 1, wherein the at least one property of the feature point is a combined y-coordinate and the reliability score.

4. The method of claim 1, wherein the first direction is a forward direction and the second direction is a backward direction.

5. The method of claim 1, wherein each of the pixels of the first plurality of pixels are different from each of the pixels of the second plurality of pixels.

6. The method of claim 1, wherein the sum of the first plurality of pixels and the second plurality of pixels is 8.

7. The method of claim 6, wherein the first plurality of pixels includes four pixels and the second plurality of pixels includes four pixels, with each pixel of the first plurality of pixels being different from each pixel of the second plurality of pixels.

8. The method of claim 1, wherein:
the first plurality of pixels includes a first pixel that is a left neighbor pixel with respect to the pixel to which the feature point corresponds, a second pixel that is a top left neighbor pixel with respect to the pixel to which the feature point corresponds, a third pixel that is a top neighbor pixel with respect to the pixel to which the feature point corresponds, and a fourth pixel that is a top right neighbor pixel to the pixel to which the feature point corresponds; and
the second plurality of pixels includes a fifth pixel that is a right neighbor pixel with respect to the pixel to which the feature point corresponds, a sixth pixel that is a bottom right neighbor pixel with respect to the pixel to which the feature point corresponds, a seventh pixel that is a bottom neighbor pixel with respect to the pixel to which the feature point corresponds, and an eighth pixel that is a bottom left neighbor pixel to the pixel to which the feature point corresponds.

9. An electronic device comprising:
a processor;
a memory to store image data and program instructions that, when executed by the processor, cause the processor to:
retreive a list of feature points of an image from the image data stored in the memory, wherein each feature point corresponds to a pixel of the image and has properties including an x-coordinate, a y-coordinate, and a reliability score;
initialize a valid list, the initialized valid list indicating that all of the feature points of the list are non-suppressed feature points;
perform a first scan of the list of feature points in a first direction in which, for each feature point, at least one property of the feature point is compared a corresponding property of each of a first plurality of feature points, wherein each of the first plurality of feature points correspond to a respective one of a first plurality of pixels, and wherein each of the first plurality of pixels neighbor the pixel to which the feature point corresponds;
update the valid list in response to the first scan to obtain an intermediate valid list;
perform a second scan of the list of feature points in a second direction in which, for each feature point, at least one property of the feature point is compared a corresponding property of each of a second plurality of feature points, wherein each of the second plurality of feature points correspond to a respective one of a second plurality of pixels, and wherein each of the second plurality of pixels neighbor the pixel to which the feature point corresponds;
update the intermediate valid list in response to the second scan to obtain a final valid list, wherein the final valid list indicates that at least one of the feature points of the list is to be suppressed; and
generate a non-maxima suppressed feature point list that includes only feature points from the list that the final valid list indicates are not to be suppressed.

10. The electronic device of claim 9, wherein the at least one property of the feature point is the y-coordinate and the reliability score.

11. The electronic device of claim 9, wherein the at least one property of the feature point is a combined y-coordinate and the reliability score.

12. The electronic device of claim 9, wherein the first direction is a forward direction and the second direction is a backward direction.

13. The electronic device of claim 9, wherein each of the pixels of the first plurality of pixels are different from each of the pixels of the second plurality of pixels.

14. The electronic device of claim 9, wherein the sum of the first plurality of pixels and the second plurality of pixels is 8.

15. The electronic device of claim 14, wherein the first plurality of pixels includes four pixels and the second plurality of pixels includes four pixels, with each pixel of the first plurality of pixels being different from each pixel of the second plurality of pixels.

16. The electronic device of claim 9, wherein:
- the first plurality of pixels includes a first pixel that is a left neighbor pixel with respect to the pixel to which the feature point corresponds, a second pixel that is a top left neighbor pixel with respect to the pixel to which the feature point corresponds, a third pixel that is a top neighbor pixel with respect to the pixel to which the feature point corresponds, and a fourth pixel that is a top right neighbor pixel to the pixel to which the feature point corresponds; and
- the second plurality of pixels includes a fifth pixel that is a right neighbor pixel with respect to the pixel to which the feature point corresponds, a sixth pixel that is a bottom right neighbor pixel with respect to the pixel to which the feature point corresponds, a seventh pixel that is a bottom neighbor pixel with respect to the pixel to which the feature point corresponds, and an eighth pixel that is a bottom left neighbor pixel to the pixel to which the feature point corresponds.

* * * * *